(12) United States Patent
Iversen et al.

(10) Patent No.: US 10,184,574 B2
(45) Date of Patent: Jan. 22, 2019

(54) MIXING VALVE

(71) Applicant: GRUNDFOS HOLDING A/S, Bjerringbro (DK)

(72) Inventors: Kåre Iversen, Langå (DK); Torben Heilskov Overgaard, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 107 days.

(21) Appl. No.: 14/978,084

(22) Filed: Dec. 22, 2015

(65) Prior Publication Data

US 2016/0178073 A1    Jun. 23, 2016

(30) Foreign Application Priority Data

Dec. 22, 2014    (EP) .................................... 14199741

(51) Int. Cl.

| F16K 11/08 | (2006.01) |
|---|---|
| F16K 11/085 | (2006.01) |
| F16K 37/00 | (2006.01) |
| F16K 27/06 | (2006.01) |
| F24D 19/10 | (2006.01) |

(52) U.S. Cl.
CPC ........ *F16K 11/0853* (2013.01); *F16K 27/065* (2013.01); *F16K 37/005* (2013.01); *F24D 19/1024* (2013.01); *F24D 2220/0242* (2013.01)

(58) Field of Classification Search
CPC .. F16K 11/0853; F16K 27/065; F16K 37/005; F24D 19/1024; F24D 2220/0242
See application file for complete search history.

(56) References Cited

U.S. PATENT DOCUMENTS

| 4,674,678 | A | | 6/1987 | Knebel et al. | |
|---|---|---|---|---|---|
| 5,383,491 | A | * | 1/1995 | Heilman | ................ B01D 35/12 137/545 |
| 5,911,212 | A | * | 6/1999 | Benson | ............... F02B 29/0418 123/563 |
| 6,488,261 | B1 | | 12/2002 | Lee | |
| 6,539,899 | B1 | * | 4/2003 | Piccirilli | ................ F01P 7/167 123/41.08 |

(Continued)

FOREIGN PATENT DOCUMENTS

| CN | 101176048 A | 5/2008 |
|---|---|---|
| CN | 101 196 244 A | 6/2008 |

(Continued)

*Primary Examiner* — Matthew W Jellett
*Assistant Examiner* — Christopher Ballman
(74) *Attorney, Agent, or Firm* — McGlew and Tuttle, P.C.

(57) ABSTRACT

A heating or cooling installation control valve includes a movable valve element which is arranged in a valve space (8), as well as at least two connection channels (24, 26) which each have a first end in fluidic connection with the valve space (8) and have an opposite second end (A, B) for connection to a fluid-leading component. A sealing element (18) is arranged in at least one of the connection channels (24, 26) at a first end thereof. The sealing element is in contact with the valve element (6). The at least one connection channel (24, 26), in which the sealing element (18) is arranged, in addition to the second end (A, B), includes an assembly opening, through which the sealing element (18) can be inserted into the connection channel (24) and removed from of the connection channel (24).

20 Claims, 4 Drawing Sheets

(56) References Cited

U.S. PATENT DOCUMENTS

| | | | |
|---|---|---|---|
| 7,823,603 B2 * | 11/2010 | Cochart | F16K 11/00 137/625.17 |
| 8,061,195 B2 * | 11/2011 | Jones, III | F16K 17/065 73/248 |
| 2007/0287953 A1 * | 12/2007 | Ziv | A61M 39/223 604/31 |
| 2010/0193043 A1 | 8/2010 | Erhardt | |
| 2011/0126931 A1 * | 6/2011 | Ide | F16K 11/065 137/625.47 |
| 2011/0180738 A1 * | 7/2011 | Ito | F16K 11/0853 251/313 |
| 2013/0008542 A1 * | 1/2013 | Irwin | F16K 31/402 137/859 |
| 2013/0081727 A1 * | 4/2013 | Sugie | F16K 11/076 137/862 |
| 2014/0251472 A1 * | 9/2014 | Woods | F16K 37/005 137/599.11 |
| 2015/0059900 A1 * | 3/2015 | Miller, III | F16K 39/06 137/629 |
| 2015/0122359 A1 * | 5/2015 | Tsuchiya | F01P 7/16 137/625.47 |
| 2015/0316156 A1 * | 11/2015 | Nagahama | F16K 5/0407 137/625.46 |
| 2015/0354716 A1 * | 12/2015 | Morein | F16K 27/065 137/625.47 |

FOREIGN PATENT DOCUMENTS

| | | | |
|---|---|---|---|
| CN | 101303087 | A | 11/2008 |
| CN | 201992132 | U | 9/2011 |
| WO | 2006122078 | A2 | 11/2006 |

* cited by examiner

MIXING VALVE

CROSS REFERENCE TO RELATED APPLICATIONS

This application claims the benefit of priority under 35 U.S.C. § 119 of European Patent Application 14 199 741.1 filed Dec. 22, 2014, the entire contents of which are incorporated herein by reference.

FIELD OF THE INVENTION

The invention relates to a heating or cooling installation control valve.

BACKGROUND OF THE INVENTION

Heating or cooling installation control valves are applied in hydraulic heating or cooling installations, in order to closed-loop control the fluid flow. In particular, such valves for example are applied as mixing valves, in order to mix two fluid flows, in particular fluid flows of a different temperature. Such mixing valves are applied in heating or cooling installations, in order to be able to closed-loop control the feed temperature to a desired value.

Known valves for example comprise three connection channels, e.g. two entries and an exit which run out in a valve space in, in which a movable valve element is arranged, by way of whose displacement the run-outs or mouths of the connection channels into the valve space can be reciprocally closed and opened. For this, valve seats or seals are arranged in the region of the run-outs of the connection channels, in the valve space. These must be inserted into the valve space either through an assembly opening, through which the valve element is inserted, or through one of the connection channels. With the assembly through the connection channels, there is the disadvantage that the complete valve unit must be separated from connecting conduits for the maintenance and replacement of the valve seats.

SUMMARY OF THE INVENTION

With regard to this problem, it is an object of the invention, to provide an improved heating or cooling installation control valve, with which the necessary seals can also be easily exchanged in the installed condition.

The heating or cooling installation control valve according to the invention, in a valve housing comprises a valve space, in which a valve element is arranged in a moving or movable manner. The valve element serves for opening or closing at least one flow path and thus for changing the effective cross section of this flow path. Moreover, the control valve comprises at least two connections or connection channels, for example an entry and exit. The connection channels are connected to a flow path which runs through the valve space and whose cross section can be changed by way of displacement of the valve element for the closed-loop control of the flow. The connection channels for this in each case with a first end run out into the valve space and comprise an opposite second end which serves for the connection to a fluid-leading component, for example a connection conduit. A flange for the connection to connecting fluid-leading components, such as to a connection conduit or for example further components of a heating or cooling installation can be present at the second end. The further components e.g. can be a circulation pump. A sealing element which is in contact with (abuts with) the valve element is arranged in at least one of the connection channels at its first end. The sealing element thus forms a valve seat for the valve element. The valve element in the known manner is arranged such that it at least partly, preferably completely can cover the sealing element, so that the flow cross section which is delimited or encompassed by the sealing element is partly or completely closed. Thereby, the sealing element comes to sealingly bear on an outer surface of the valve element. This, with a movement of the valve element, slides over the valve seat formed by the sealing element.

According to the invention, the at least one connection channel which is arranged on or in the sealing element, additionally to its open second end comprises an assembly opening, through which the sealing element can be inserted into the connection channel and removed from the connection channel. This means that the sealing element neither needs to be inserted through the valve space nor through the second end of the connection channel, but can be inserted through a separate assembly opening into the connection channel, and be brought in this connection channel into the desired position adjacent the valve space. This permits the assembly and maintenance of the sealing element without having to remove the valve element from the valve space or having to separate the second end of the connection channel from the adjacent, fluid-leading components, for example a connection conduit. The assembly and maintenance of the sealing element is significantly simplified by way of this.

The control valve is particularly preferably designed as a mixing valve or mixer valve or as a flow-dividing valve with at least three connection channels. Such a mixing valve can be applied for mixing two fluid flows. In this case, two of the connection channels serve as an entry, and a third of the connection channels as an exit. Conversely, such a mixing valve can also be applied as a flow-dividing valve for dividing a fluid flow. In this case, one of the connections serves as an entry, whereas the two other connections serve as exits. The configuration is preferably such that all three connection channels are connected to the valve space, irrespectively of whether the control valve is applied for mixing or dividing fluid flows, wherein two flow paths are formed, which run from two of the connections to the third, or in the reverse direction from the third connection in each case to one of the two of the other connections. Thereby, the flow paths run through the valve space, and the valve element is situated in the flows paths, so that it can at least partly close the flow paths due to its movement or positioning. In particular, the valve element is movable such that it can change the ratio of the cross sections of the two flow paths to one another. Thereby, one further preferably envisages one of the flow paths being opened and simultaneously the other flow being closed, in a reciprocal manner.

Further preferably, in each case a sealing element is arranged in two connection channels in each case at their first end, with the use of three connection channels, wherein the sealing element forms a valve seal and is in contact or pressing contact with the valve element. Thus two valve seats for the valve element are created in the manner described above. Thereby, further preferably, both connection channels, in which a sealing element is arranged, are provided with an additional assembly opening in the manner described above, through which additional assembly opening the sealing element can be brought into the connection channel and into its position adjacent the valve space in each case.

The at least one assembly opening is preferably closed by a removable closure element, for example by a releasable cover. Thereby, the closure element is sealed to the outside, so that no fluid can exit to the outside out of the connection channel, in the region of the closure element. Such a closure element for example can be designed as a cover which can be screwed in, as a cover which can be locked with a bayonet connection, or in a similar manner. An additional seal, such as an O-ring for example or a differently shaped elastomer seal can be arranged in the cover. Preferably, the closure element is designed such that it can be opened without a tool, or with a common tool such as a jaw wrench. For this, the closure element can comprise an engagement element such as a projection or recess, with which for example a spanner, a screwdriver or likewise can engage for releasing the closure element. A screwing of the closure element with separate screws is also conceivable.

Further preferably, the at least one connection channel, in which the sealing element is arranged, comprises a first channel section running into the valve space and receiving the sealing element, and a second channel section adjacent the second end, wherein the assembly opening is situated at an axial end of the first channel section which is away from the valve space. The first channel section thus extends between the valve space and the assembly opening, so that the sealing element, given an opened assembly opening, can be inserted through this channel section and can be brought into its desired position which is adjacent the valve space. The second channel section which, departing from the first channel section, extends to the second end of the connection channel, runs out in the first channel section or is connected to this, so that a fluid-leading connection is created from the second end of the connection channel up to the valve space.

The first channel section extends preferably straight between the valve space and the assembly opening. Particularly preferably, the first channel section has an extension direction which runs along the middle axis of the sealing element or of the valve seat formed by the sealing element. This middle axis in the case of a round sealing element is preferably the symmetry axis or middle axis, about which the sealing element extends in a rotationally symmetrical manner. A straight course of the first channel section has the advantage that the sealing element in the extension direction of the channel section can be pushed through the assembly opening in a straight manner and be pushed into the position adjacent the valve space. For this, the sealing element can also be designed such that it comprises a guide element or guide body which bears on the inner wall of the first channel section and thus serves for a positioning and guiding on inserting through the assembly opening. Such a sealing element carrier carrying the actual seal can moreover serve for the fixation of the sealing element in the connection channel. This for example can be effected by way of clamping, screwing or another suitable fastening.

Further preferably, an abutment, in particular in the form of an abutment shoulder, on which the sealing element or a sealing element carrier carrying the sealing element comes to bear, is formed in the inside of the connection channel, in particular at its first end which is adjacent the valve space. The fixation of the sealing element or a sealing element carrier carrying the sealing element can be effected in the opposite axial direction or also in both axial directions by a securing means, which for example with a thread or a bayonet engages with a wall of the connection channel. The axial securing can alternatively also be effected via the closure element closing the assembly opening.

In the case that the connection channel is formed from two channel sections, as described beforehand, the second channel section preferably runs out into the first channel section in a peripheral manner. This has the advantage that the first channel section can be designed completely open in the axial direction at its second end, i.e. axial face end, in order to form the assembly opening there for inserting the sealing element. Thus, the entire inner cross section of the first channel section is released, in order to be able to insert the sealing element through this.

Further preferably, the first channel section extends radially to the valve space and/or to the valve element arranged in the valve space. This first channel section preferably extends normally to the rotation axis, about which the valve element is rotatable, in the case that it concerns a rotatable valve element, wherein the middle axis of the channel section intersects the rotation axis, preferably at an angle of 90°. Thus, the sealing element can be introduced through the first channel section in a straight manner and can be advanced in the channel section in the angular position, in which it later comes to bear with the valve element. Thereby, a guiding by way of a sealing element carrier can be effected, as described above.

According to a further preferred embodiment, a valve and/or a filter element is arranged in at least one of the connection channels, preferably in the first channel section of at least one connection channel. With such a valve, it can particularly be the case of a check valve which prevents a backflow of the fluid. The filter element can be designed as a sieve for example. The valve and/or the filter element preferably lie at the side of the sealing element which is away from the valve element. The valve and/or filter element can likewise be inserted through the assembly opening into the connection channel or its first channel section, depending on the requirements. An insertion can thereby be effected together with the sealing element or one after the other. Thus, the securing or fixation of the sealing element can also be effected by way of the subsequently inserted valve and/or filter element. It is also conceivable to design the sealing element as one piece with a valve and/or a filter element, as a premanufactured subassembly which as a whole can be inserted through the assembly opening into the connection channel.

Particularly preferably, the sealing element as well as the valve and/or filter element are designed as separate components which can be inserted and removed through the assembly opening one after the other. This has the advantage that a universally designed sealing element can be applied, which can be inserted with and without additional components, such as a valve or a filter element. Moreover, the individual components, which are to say e.g. a valve, a filter element and the sealing element, can be exchanged independently of one another.

According to a further preferred embodiment, the second channel section is connected to a sensor space, in which a sensor, in particular a pressure sensor and/or temperature sensor is arranged. Such a pressure sensor and/or temperature sensor in particular can be a combined different pressure sensor and temperature sensor. The temperature sensor detects the temperature of the fluid in the second channel section. The pressure sensor or the pressure transducer of the combined sensor preferably detects the inner pressure in the channel section or a differential pressure between the channel section and a further region in the inside of the control valve. The sensor receiving space is preferably designed such that it is open to the outside, so that a sensor can be inserted and removed from the outside. This means that the sensor does not need to be inserted through the assembly opening or other parts of the connection channel. The arrangement of a sensor receiving space which is situated outside the channel section but which is connected to this has the advantage that the sensor does not need to project into the channel section itself, so that the flow cross section there is not limited by the sensor, and the sensor does not inhibit the insertion or removal of the sealing element as well as of a filter or an additional valve as the case may be.

Further preferably, the sensor space can be connected to one of the connection channels and to the valve space. This means the sensor receiving space is preferably connected to the second channel section of a connection channel and to the valve space. It is thus possible to detect the pressure difference between the valve space and the connection channel with a differential pressure sensor inserted into the sensor receiving space, said differential pressure sensor being able to be designed as a combined temperature and differential pressure sensor. The pressure difference at the entry side and exit side of the valve formed by the valve element is thus determined. Therefore, for example, the flow through the connection channel can also be computed by way of the position of the valve element and the flow cross section which is defined by this.

The valve element is particularly preferably designed in a ball-like manner and is rotatingly movable in the valve space about an axis. Thereby, the valve element preferably slides along the sealing elements forming a valve seat in each case, as described above. Recesses or free spaces can be formed in the ball-like valve element and, if they go into the region of the sealing elements or valve seats, they define flow paths or flow passages, so that fluid can flow through the valve. These recesses can be brought to overlap with the sealing elements to a different degree by way of displacement of the valve element, so that the flow cross sections can be changed. The first channel section of the connection channel which is described above preferably extends normally to the rotation axis and radially to the surface of the ball-shaped valve element.

The valve space according to a further preferred embodiment additionally to the connection channels comprises a valve assembly opening, through which the valve element can be inserted into the valve space and removed from the valve space. The valve assembly opening is preferably arranged at a side of the valve space which is away from the sides, at which the connection channels run out into the valve space. Preferably, the valve assembly opening lies essentially transversely or at right angles to the openings, at which the connection channels run out into the valve space. The valve assembly opening has the advantage that the valve element can be removed independently out of the valve space, without having to disassemble other parts of the control valve. The valve assembly opening is preferably closed by a releasable cover comprising a through-opening, through which a shaft for rotating the valve element in the inside of the valve space extends outwards. The valve space and the connection channels are further preferably formed in a common valve housing which is preferably manufactured from metal. An integrated construction unit of these parts is thus created, which in particular can be manufactured of one piece, so that further assembly steps can be avoided and the number of interfaces to be sealed is reduced.

Particularly preferably, at least one wall section of a wall delimiting the valve space and at least one wall section of at least one of the connection channels and preferably of all connection channels are formed with one another as a single piece. Particularly preferably, all walls of the valve space and of the connection channels with the exception of any covers which close the necessary openings such as the assembly opening and the valve assembly opening, are designed as one piece. This in particular can be effected by way of casting/molding the valve housing, for example from metal. Thus, all essential flow paths can be integrated directly into a single-piece housing part.

According to a further preferred embodiment of the invention, the heating or cooling installation control valve according to the invention comprises two connection channels whose first channel sections which are adjacent the valve space are directed at an angle of greater than 90° to one another. Thus, the two valve seats which are arranged in these channel sections, with respect to the rotation axis of the valve element are likewise situated in angular positions which are distanced by more than 90° to one another. Further preferably however, the two ends of the associated connection channels are situated such that they are directed at an angle of 90° to one another, which means their face sides are arranged at an angle of 90° to one another. If a third connection channel is provided, then its second end is preferably aligned along the same longitudinal axis as the second end of a first connection channel, whereas the second connection channel with its second end is aligned at an angle of 90° to the two other connection channels. Thus a T-shaped configuration of the connections of the control valve is created, and this configuration corresponds to a connection configuration which is common with such valves.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
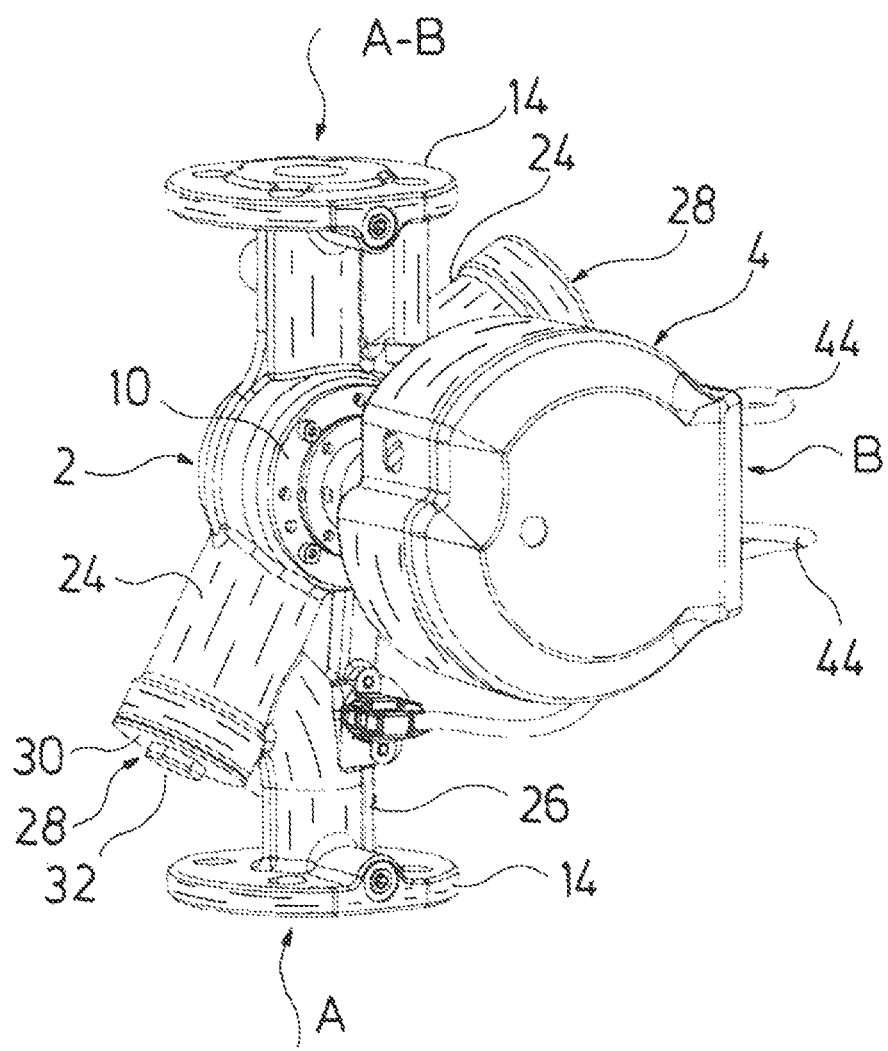
FIG. 1 is a perspective view of a heating or cooling installation control valve according to the invention.

Referring to the drawings, a control valve which is shown in FIG. 1 is designed as a mixing valve or as a flow-dividing valve and consists essentially of two components, specifically of a valve housing 2 and of a drive 4. A movable valve element 6 (see FIG. 3) in the form of a ball is arranged in the inside of the valve housing 2. The valve element 6 is situated in a valve space 8 and is rotatable by the drive 4 about its rotation axis X. The rotation axis X extends through the ball centre of the valve element 6. The valve element 6 for the connection to the drive 4 comprises a shaft which extends outwards through an opening in the cover 10 covering closing a valve assembly opening 12 of the valve housing 2. The drive 4 for example comprises a stepper motor and associated control electronics.

Figure 2:
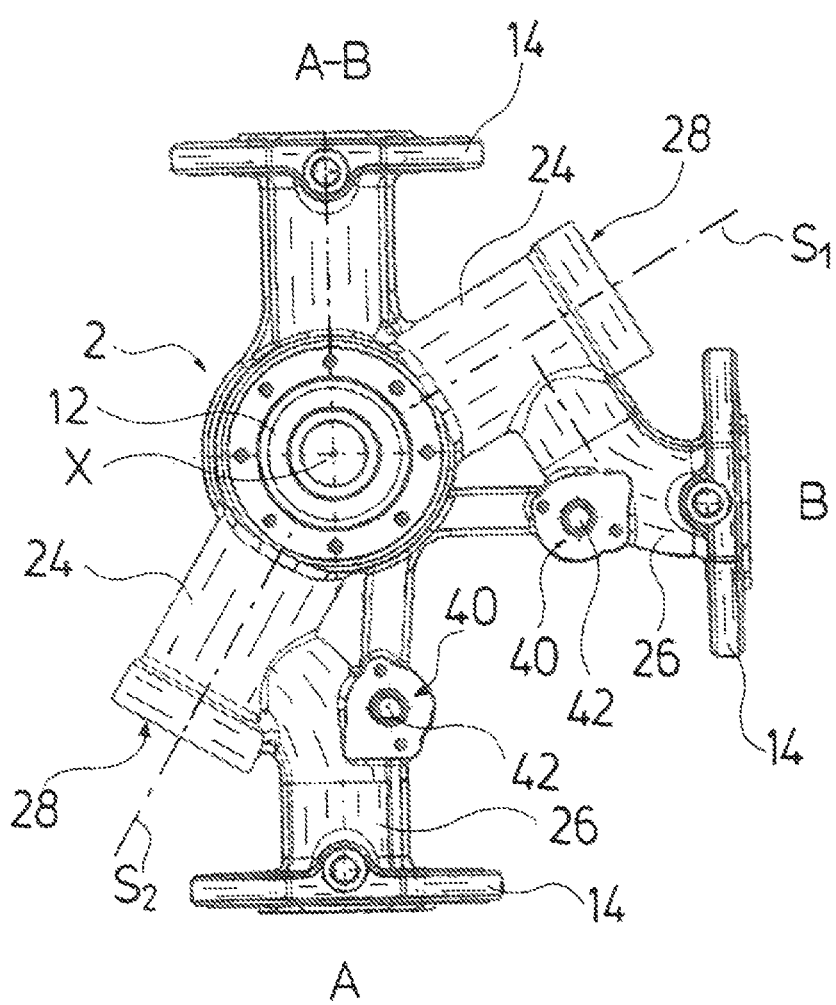
FIG. 2 is a plan view of the valve housing of the control valve according to FIG. 1, without drive.
Figure 3:
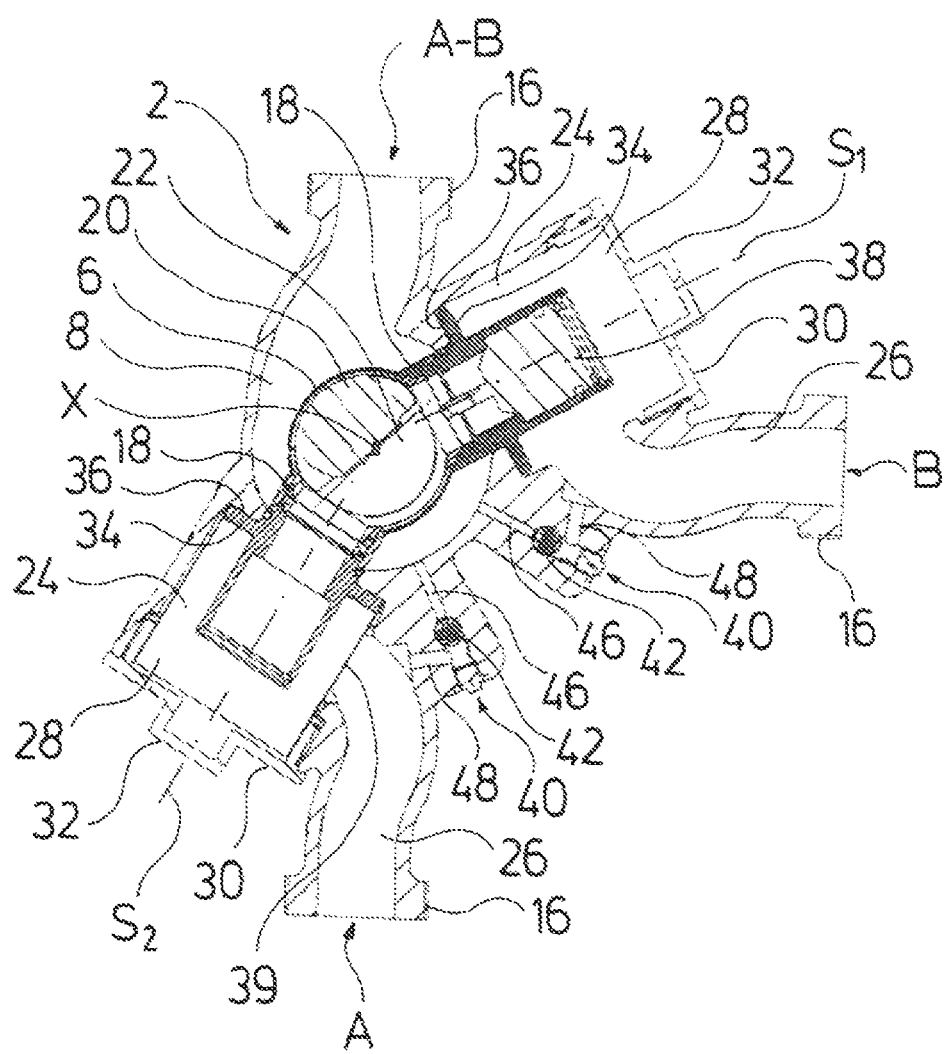
FIG. 3 is a sectioned view of a valve housing which in its basic construction corresponds to the valve housing according to FIG. 2.
Figure 4:
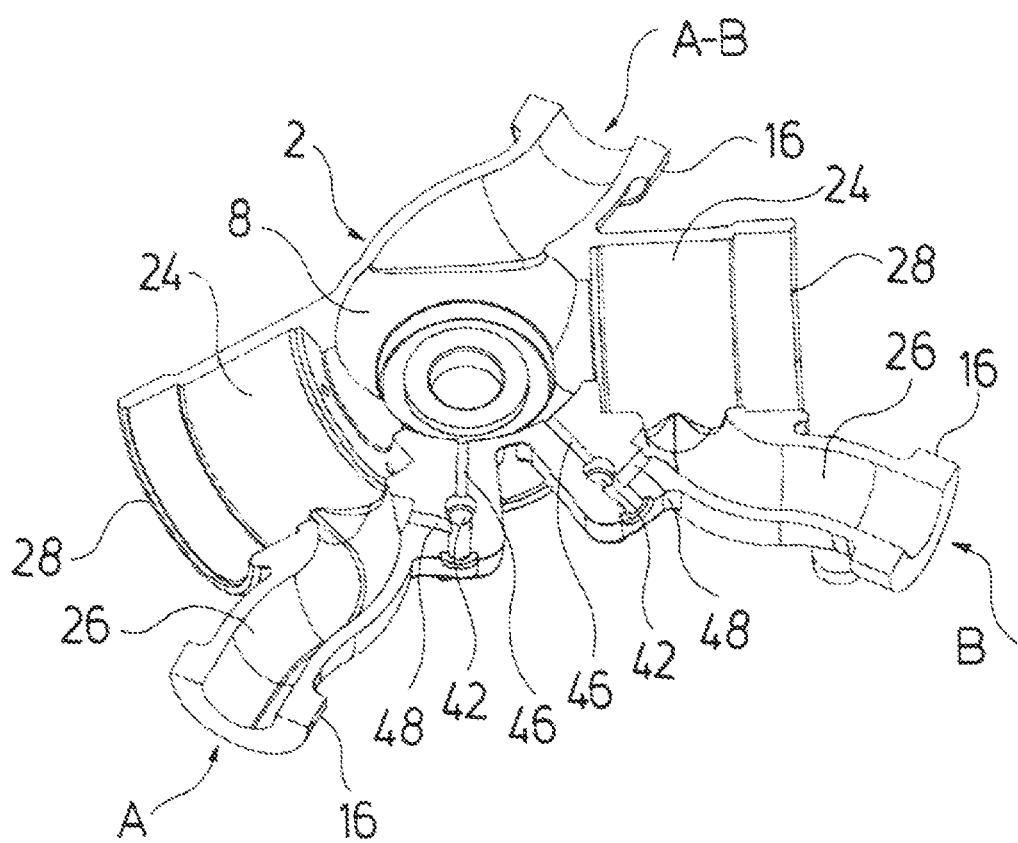
FIG. 4 is a sectioned perspective view of the valve housing according to FIGS. 1 and 2.

The valve housing 2 in this embodiment example comprises three connections A, B and A-B which are in connection with the valve space 8 via connecting connection channels. The connections A and B serve as entries and the connection A-B serves as an exit for a mixed fluid, given the use as a mixing valve for mixing two fluid flows. Conversely, the valve can also be applied as a flow-dividing valve for dividing a fluid, and then the connection A-B serves as an entry and the connections A and B serve as exits, from which a part of the fluid fed to the connection A-B exits in each case. The connections A, B and A-B in the examples according to FIGS. 1, 2 and 4 are provided with flanges 14. An alternative design as a thread 16 for the connection of connecting conduits is shown in the view according to FIGS. 3 and 4. The connection channels from the connections A and B run out in the valve space 8 in each case at a valve seat which is formed by a sealing element 18, as is shown in FIG. 3. The sealing elements 18 sealingly bear on the surface of the valve element 6. The valve element 6 comprises a closed section 20 as well as a recess 22. If the closed section 20 completely covers a valve seat, which means completely covers and closes the passage encompassed by the sealing element 18 then the associated flow path of the respective connection channel is closed. If the recess 22 completely or partly comes to overlap with the flow passage encompassed by the sealing element 18, then this passage and thus the connection to the respective connection channel is completely or partly opened. The valve element 6 is thus formed such that when it rotates, it simultaneously opens the flow path of a connection channel A, whereas it simultaneously closes the flow path of the second connection channel B, or vice versa. Thus, a mixing or dividing ratio of the flows flowing through the connections A and B can be set.

The connection channels connecting to the connections A and B each comprise a first channel section 24 and a second channel section 26. The second channel section 26 in each case ends at a second open end of the connection channel which forms the connection A and B. The first channel section 24 in each case forms the first end of the connection channel, on which the sealing element 18 is arranged and which is open to the valve space 8.

The first channel sections 24 extend with their longitudinal axes $S_1$ and $S_2$ normally to the rotation axis X of the valve element 6, which means radially to the valve element 6. Thereby, the two first channel sections 24 with their longitudinal axes $S_1$ and $S_2$ extend in a common plane which runs normally to the rotation axis X of the valve element 6. Simultaneously, the two longitudinal axes $S_1$ and $S_2$ are angled to one another at an angle of greater than 90°, here at an angle of 150°. The first channel sections 24 departing from their first end facing the valve space 8 extend in a straight manner to an assembly opening 28 which is situated at the opposite axial end seen in the direction of the longitudinal axis $S_1$ or $S_2$. The assembly openings 28 in each case are closed by a closure element in the form of a removable cover 30. In this embodiment example, the covers 30 can be screwed into the assembly openings 28 via a thread. The covers 30 for rotation, centrally each comprise a hexagonal projection 32 which can be gripped by a spanner for example, in order to rotate the cover 30. The cover 30 can be of plastic or of metal. The valve housing 2 is preferably manufactured as a molded/cast component of metal.

The sealing elements 18 are each fastened on a sealing element carrier 34, which carries the sealing elements 18 and fixes them in the first channel sections 24 in a defined position. The sealing element carrier 34 thereby bears on a contact shoulder 36 in the first channel section 24, wherein the contact shoulder 36 prevents the axial movement in the direction towards the valve space 8 and thus fixes the sealing element 18 in this direction. The axial fixation of the sealing element carrier 34 and of the sealing element 18 fastened on it is effected in the opposite direction in each case by the cover 30, a thread or in another manner which is not shown in more detail here.

The first channel sections 24 here are not only designed in a straight manner, but have a continuously constant inner cross section from their axial end facing the valve space 8, up to the assembly opening 28 or widen to the assembly opening 28, so that the sealing element 18 with the sealing element carrier 34 in each case can be inserted through the assembly opening 28 from the outside, and advanced up to into the position which is shown in FIG. 3 and in which the sealing elements 18 come to sealingly bear on the valve element 6. The insertion and exchange are possible independently of the connections A and B due to the insertion and exchange of the sealing elements 18 through the assembly openings 28. Thus, the valve housing 2 can also remain installed in a heating or cooling installation for the exchange of the sealing element 18, which means than any connection conduits which are connected to the connections A and B do not need to be released.

A further component such as a check valve 38 and/or a filter or sieve 39 for example can also be inserted into the first channel sections 24, apart from a valve element 18. Such a check valve 38 is shown in FIG. 3 in the first channel section 24 of the flow path leading to the second connection B. A filter or a sieve 39 in the form of a tubular sieve insert is shown in the first channel section 24 of the flow path leading to the first connection A. These additional components such as valves or filters or sieves 39 can also be easily exchanged or cleaned through the assembly openings 28.

The second channel sections 26 of the connection channels run from the connections A and B in an arcuate manner such that they run out peripherally into the first channel sections 24. Thus, the second channel sections 26 or the housing parts forming them, and the flanges 14 or threads 16 lie outside the inner cross section as well as the radially outwardly extending projections of the respective inner cross section of the channel sections 24. Thus these components do not inhibit the insertion and removal of components out of the first channel sections 24. Moreover, it is also possible to arrange the three connections A, B and A-B at right angles to one another in the usual manner, i.e. to arrange them in a T-shaped manner to one another.

Moreover, two sensor receivers 40 are formed in the valve housing 2. These each have a sensor receiving space 42, into which a measurement or recording region or measurement probe of a sensor can engage. These sensors are preferably combined temperature-differential pressure sensors which are connected outside the valve housing 2 via cables 44 to the electronics of the drive 4. The sensor receiving spaces 42 are each connected via a connection channel 46 to the inside of the valve space 8, wherein they run out into the valve space 8 in a region outside the valve element 6 and thus can detect the pressure at a side of the valve element 6 which is away from the sealing elements 18, in the flow path. Moreover, each sensor receiving space 42 is connected via a connection 48 to the associated second channel section 26. Thus, a differential pressure sensor which is inserted into the sensor receiving space 42 can detect a pressure difference between the associated second channel section 26 and the valve space 8, which means upstream and downstream of the cross-sectional reduction formed by the valve element 6. The flow for example can be determined on the basis of this differential pressure. A sensor for detecting the temperature and/or the pressure does not compromise the flow through the second channel section 26 due to the fact that the sensor receiving space 42 is situated outside the flow path in the second channel section 26.

As is to be recognized in the figures, the design according to the invention permits all essential components to be integrated into a common valve housing 2, wherein this valve housing 2 with the exception of the cover and closure elements, in particular the cover 10 and the covers 30, can be designed as one piece. Despite this, a good accessibility to the sealing elements 18 as well as possible valves and filters is given by way of the additional assembly openings 28 which can be opened independently of the connections A and B, by which means the assembly ability and maintenance is simplified.

While specific embodiments of the invention have been shown and described in detail to illustrate the application of the principles of the invention, it will be understood that the invention may be embodied otherwise without departing from such principles.

APPENDIX

List of Reference Numbers

| | |
|---|---|
| 2 | valve housing |
| 4 | drive |
| 6 | valve element |
| 8 | valve space |
| 10 | cover |
| 12 | valve assembly opening |
| 14 | flange |
| 16 | thread |
| 18 | sealing elements |
| 20 | closed section |
| 22 | recess |
| 24 | first channel sections |
| 26 | second channel sections |
| 28 | assembly openings |
| 30 | covers |
| 32 | projections |
| 34 | sealing element carrier |
| 36 | abutment shoulders |
| 38 | check valve |
| 39 | filter |
| 40 | sensor receivers |
| 42 | sensor receiving spaces |
| 44 | cable |
| 46 | connection channels |
| 48 | connections |
| A, B, A-B | connections |
| X | rotation axis |
| $S_1, S_2$ | longitudinal axes |

What is claimed is:

1. A heating or cooling installation control valve comprising:
    a movable valve element arranged in a valve space;
    at least two connection channels which each run out with a first end into the valve space and which each have an opposite second end for connection to a fluid-leading component; and
    a sealing element arranged in at least one of the connection channels at the first end of said at least one of the connection channels, said sealing element being in contact with the valve element, wherein said at least one of the connection channels, in which the sealing element is arranged, in addition to the second end comprises an assembly opening, through which the sealing element is inserted into said at least one of the connection channels and removed from said at least one of the connection channels, wherein the valve space, in addition to the connection channels, comprises a valve assembly opening, through which the valve element is inserted into the valve space and removed from the valve space, the valve assembly opening being arranged at a side of the valve space located away from sides of the valve space at which the connection channels run out into the valve space.

2. A heating or cooling installation control valve according to claim 1, further comprising:
    a cover, each of the at least two connection channels comprising a channel connection section, the channel connection section and the cover defining an inner space; a sealing element carrier connected to the sealing element, at least a portion of the sealing element carrier being arranged in the inner space, wherein the control valve is designed as a mixing valve or as a flow-dividing valve, with at least three connection channels, wherein the valve assembly opening is separate from the assembly opening, wherein the sealing element is inserted into the at least one connection channel through the assembly opening without removing a piping connected to the connection channel.

3. A heating or cooling installation control valve according to claim 2, further comprising another sealing element in contact with the valve element, wherein one of the sealing elements is respectively arranged in each of the two connection channels, in each case at a first end thereof.

4. A heating or cooling installation control valve according to claim 2, further comprising a removable closure element, wherein the assembly opening is closed by the removable closure element.

5. A heating or cooling installation control valve according to claim 2, wherein:
    the at least one connection channel, in which the sealing element is arranged comprises a first channel section which runs out into the valve space and receives the sealing element, and a second channel section which is adjacent to the second end; and
    the assembly opening is situated at an axial end of this first channel section, said axial end being away from the valve space.

6. A heating or cooling installation control valve according to claim 5, wherein the first channel section runs in a straight line between the valve space and the assembly opening.

7. A heating or cooling installation control valve according to claim 5, wherein the second channel section peripherally runs out into the first channel section.

8. A heating or cooling installation control valve according to claim 5, wherein the first channel section extends radially at least one of to the valve space and to the valve element arranged in the valve space.

9. A heating or cooling installation control valve according to claim 5, further comprising at least one of a valve and a filter element arranged in the first channel section of at least one connection channel.

10. A heating or cooling installation control valve according to claim 9, wherein the sealing element and said at least one of the valve and the filter element are separate components which can be inserted and removed, one after the other, through the assembly opening.

11. A heating or cooling installation control valve according to claim 5, further comprising a sensor comprising at least one of a pressure sensor and a temperature sensor wherein the first channel section is connected to a sensor receiving space, in which said sensor is arranged.

12. A heating or cooling installation control valve according to claim 11, wherein the sensor receiving space is connected to one of the connection channels and to the valve space.

13. A heating or cooling installation control valve according to claim 2, wherein the valve element is configured as a ball-shape and is rotatingly movable in the valve space about an axis.

14. A heating or cooling installation control valve according to claim 2, wherein the valve space and the connection channels are formed in a common valve housing comprised of metal.

15. A heating or cooling installation control valve according to claim 14, wherein at least one wall section of a wall delimiting the valve space, and at least one section of at least one of the connection channels are formed as one piece.

16. A heating or cooling installation control valve comprising:
a housing defining a valve space and at least two connection channels which each run out with a first end into the valve space and which each have an opposite second end for connection to a fluid-leading component, one of the at least two connection channels being arranged on one side of the valve space, another one of the at least two connection channels being arranged on another side of the valve space;
a movable valve element arranged in a valve space; and
a sealing element arranged in at least one of the connection channels at the first end of said at least one of the connection channels, said sealing element being in contact with the valve element, wherein said at least one of the connection channels, in which the sealing element is arranged, in addition to the second end comprises an assembly opening, through which the sealing element is inserted into said at least one of the connection channels and removed from said at least one of the connection channels, wherein the valve space, in addition to the connection channels, comprises a valve assembly opening, through which the valve element is inserted into the valve space and removed from the valve space, the valve assembly opening being arranged at yet another side of the valve space located away from the one side and the another side of the valve space.

17. A heating or cooling installation control valve according to claim 16, further comprising:
a cover, each of the at least two connection channels comprising a channel connection section, the channel connection section and the cover defining an inner space; a sealing element carrier connected to the sealing element, at least a portion of the sealing element carrier being arranged in the inner space, wherein the housing defines at least another connection channel to provide at least three connection channels, whereby the control valve forms at least one of a mixing valve and a flow-dividing valve, wherein the valve assembly opening is separate from the assembly opening, wherein the sealing element is inserted into the at least one connection channel through the assembly opening without removing a piping connected to the connection channel.

18. A heating or cooling installation control valve according to claim 17, further comprising another sealing element in contact with the valve element, wherein one of the sealing elements is respectively arranged in each of the two connection channels, in each case at a first end thereof.

19. A heating or cooling installation control valve according to claim 17, further comprising a removable closure element, wherein the assembly opening is closed by the removable closure element.

20. A heating or cooling installation control valve comprising:
a control valve housing comprising an assembly opening, a valve assembly opening, at least two connection channels and a valve space, each channel having a first open end adjacent to the valve space and a second open end for connection to a fluid-leading component, one of the at least two connection channels being arranged on a first side of the valve space, the one of the at least two connection channels facing in a first direction, another one of the at least two connection channels being arranged on a second side of the valve space, the another one of the at least two connection channels facing in a second direction, the valve assembly opening being in fluid communication with the valve assembly space, at least one of the at least two connection channels being associated with the assembly opening and in fluid communication with the assembly opening, the valve assembly opening facing in a direction different from a direction of the assembly opening;
a movable valve element inserted into the valve space via the valve assembly opening, the valve assembly opening being arranged on a third side of the valve space, the third side being located at a spaced location from the first side and the second side, the valve assembly opening facing in a third direction, the third direction being different from the first direction and the second direction; and
a sealing element removably inserted into the assembly opening such that the sealing element is arranged in at least one of the connection channels at the first end of the at least one of the connection channels, wherein the sealing element seals the first end of the at least one of the connection channels, the sealing element being in contact with the valve element.

* * * * *